Sept. 12, 1961   G. J. BURSAK   2,999,532
COMBINED SHEAR AND HEAT SEAL APPARATUS
Filed Sept. 17, 1958   2 Sheets-Sheet 1

INVENTOR
GEORGE J. BURSAK

BY Quarles, Fox, Seidel,
Bateman & Hoar

ATTORNEYS

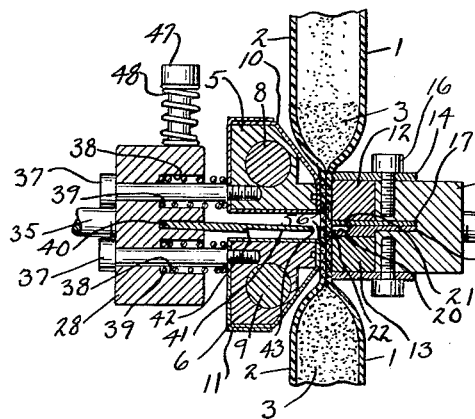

2,999,532
COMBINED SHEAR AND HEAT SEAL APPARATUS
George J. Bursak, 5601 W. Auer Ave.,
Milwaukee 16, Wis.
Filed Sept. 17, 1958, Ser. No. 761,491
3 Claims. (Cl. 154—42)

The present application relates in general to means for sealing marginal portions of facing webs of heat-sealable material and includes means for cutting or trimming the webs to desired dimension concurrently with the heat sealing operation. My invention has particular application to package and bag forming equipment arranged for continuous forming, filling and sealing operation in the case of packaging, and of continuously forming and sealing selected marginal portions in the case of manufacturing open-ended bags adapted for later filling and sealing operations.

It is an object of the present invention to provide an apparatus for sealing marginal portions of facing sealable webs simultaneously with cutting, shearing or trimming the said webs to desired size.

It is another object of the present invention to provide an improved apparatus for adaptation to continuously operated package forming, filling and sealing equipment wherein the improved apparatus is arranged to simultaneously seal both the lower margin of a heat sealable package arranged to be subsequently filled and the upper margin of a previously formed and filled package and which is further arranged to shear the sealed members to separate one from the other.

It is a further object of the present invention to provide an improving bag making apparatus which may be arranged for continuous operation to provide unfilled bags having one end open from continuous opposed webs of heat sealable material, wherein parallel longitudinal margins are formed in continuous, uninterrupted fashion and where one end of the bag is formed by heat-sealing and simultaneously trimmed and sheared to size from the continuously moving, longitudinal sealed webs.

The foregoing and other objects and advantages of the invention will appear in the description to follow. In the description, reference is made to the accompanying drawings, which form a part hereof, and to which there is shown by way of illustration, and not of limitation, specific forms in which the invention may be embodied.

In the drawings:

FIG. 3 is a fragmentary sectional view, in enlarged detail, of the combination shear and heat sealing means in heat-sealing position relative to opposed web members, but prior to actuation of the coacting cutoff knife blades towards shear position;

FIG. 4 is a fragmentary detail sectional view taken in the approximately plane of FIG. 3 and indicating the apparatus in combined heat-sealing and web shearing position relative to the opposed webs;

FIG. 5 is a sectional view taken along lines 5—5 of FIG. 1 to illustrate the detail of a coacting combination sealing bar and knife blade member;

Figure 1:
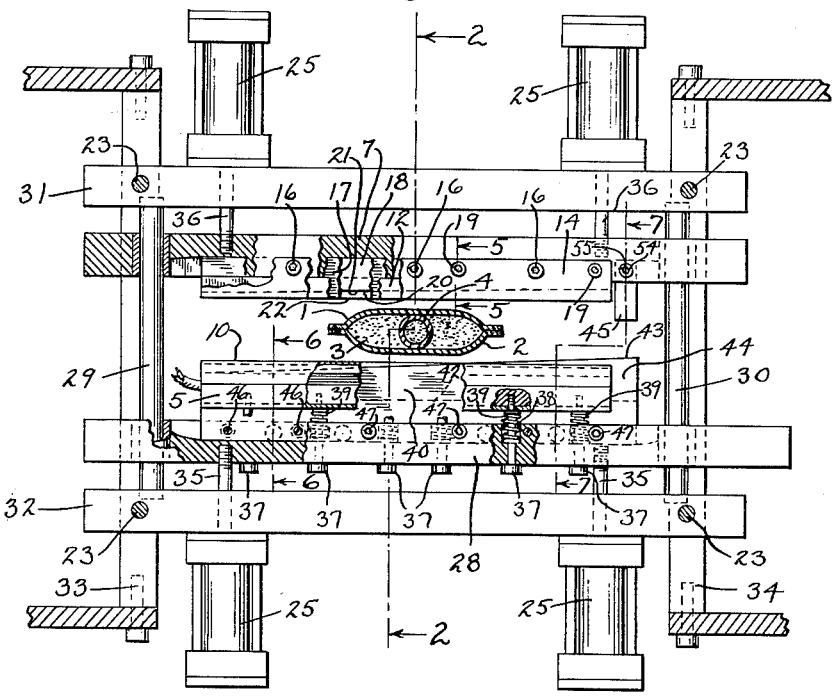
FIG. 1 is a top plan view, partially in section and partly broken away, of a continuous package forming, filling and sealing machine to which the present invention may be readily adapted.

FIGS. 6 and 7 are illustrative of another embodiment of the present invention and illustrate, partially in section and partially in elevation, a modified construction wherein one of a pair of companion sealing bars has been removed from the apparatus to permit heat-sealing of a lower marginal portion of a previously formed bag member and simultaneous shearing of the top margin of a previously formed and sealed web member to provide an open-ended bag adapted for later filling and sealing or tying of the open end thereof. In particular, FIGS. 6 and 7 are sectional views of a sealing member assembly, with the lower sealing bar removed, but taken in respective irregular planes approximately lines 6—6 and 7—7 of FIG. 1.

Referring now to the drawings, it will be apparent that the present invention has particular adaptation to automatic continuous package forming and filling apparatus, although application may be readily found in single operation sealing equipment, wherein it is desired to seal and trim the margin of a previously formed and filled bag, or for purposes of forming open-end and unfilled bags by continuous operation. For illustrative purposes, the present invention may be readily adapted for use in the Continuous Belt Feed Heat Sealing Apparatus described and claimed in my copending application, Serial No. 725,902, filed April 2, 1958.

Figure 2:
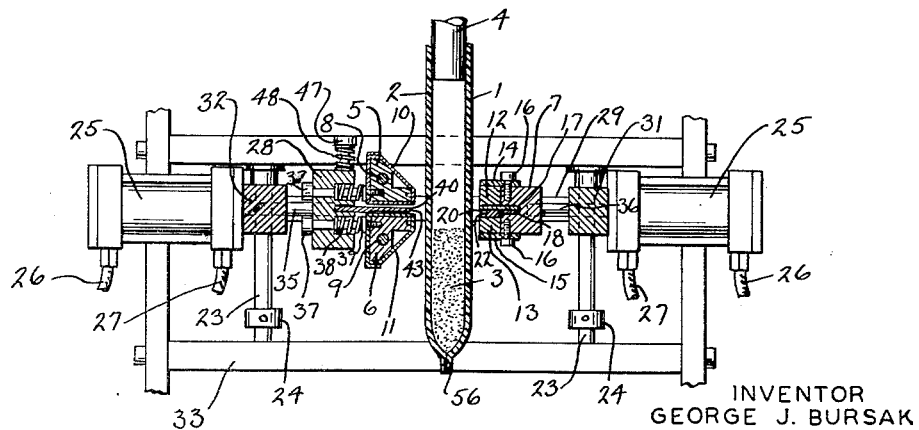
FIG. 2 is a sectional view taken along lines 2—2 of FIG. 1 and indicating the means for filling a partially finished package from continuous webs of heat sealable material and with the combination transverse sealing bars and shear means in position prior to transverse heat sealing operation.

With reference to FIGS. 1 and 2, it will be observed that the combination heat sealing and web shearing means of the present invention may be adapted to any manually or automatically operated apparatus which utilizes a sealing bar for heat sealing a marginal edge of a bag or package formed from opposed webs 1 and 2 of heat sealable material. For illustrative purposes, the present invention is embodied in an apparatus for continuously forming, filling and sealing a package which may contain any material 3 of the usual materials adapted to be fed from a tube 4 about which the webs 1 and 2 are disposed, and which tube may depend from a conventional hopper (not shown). The hoppers are well-known and are of the type from which regulated amounts of material 3 may be dispensed, either manually or by automatic arrangement depending upon periodic operation of coacting members of the packaging apparatus.

In the present embodiment, the webs 1 and 2 are arranged to be continuously moved in a downward direction relative to FIGS. 2–7, in accordance with the practice of the aforementioned copending application, Serial No. 725,902. Longitudinal marginal seals are continuously provided by means not shown herein, but which may comprise direct application of heated rollers or their positioning opposed continuously traveling belt drives impinged between heated blocks biased for opposed relative movement towards one another. It will be apparent, however, that the present invention, as hereinafter described, will provide equally successful operation in manually operated, single step apparatus for sealing and shearing of excess marginal web material from individual open-ended bags which may be filled and sealed at stations remote from their initial forming operation, such as, for instance, when used at food processing plants and places where continuous bag forming and filling operations are not justifiable for economic, operational or other reasons.

In any case, however, sealing means, such as the coacting cross sealing bars 5, 6 and sealing means suspended from the movable support member 7 are provided. Sealing bars 5 and 6 contain heating elements, 8 and 9 which may be in the form of electrical resistance units.

As described and claimed in my copending application, I have found it to be desirable when packages and bags are formed of web materials of a particularly heat sensitive nature, such as in the case of films of polyvinyl alcohol, to cover the cross sealing bars 5 and 6 with an insulating non-adherent surface material in the form of fiberglass cloth members 10 and 11 each having a surface coating of Teflon (polytetrafluoroethylene). Corresponding companion sealing bars 12 and 13 fastened to support member 7 are also preferably of solid insulating material, which may be formed from Teflon. It has been found to be unnecessary, in most instances, to provide heating elements for the bars 12 and 13, but, if desired, it is within the scope of the invention to provide the elements.

The Teflon sealing bars 12 and 13 may be retained in place relative to its support member 7 by means of opposed longitudinally extending clamping plates 14 and 15, which are retained in place at opposite sides of the supporting bar 7 by means of a plurality of spaced clamping bolts 16. Each of the bars 12 and 13 are independently impinged between its respective clamping plate 14 and 15 and knife member 17 and its adjacent longitudinal shim 18. The knife member 17 and shim 18 are disposed in releasable arrangement in a longitudinal slot of the support member 7 by means of spaced machine screw members 19 which may be alternatively positioned intermediate machine screw members 16, shown in FIG. 5. The shim member 18 of the support members 7 includes a stepped surface 20 provided with a sloping shoulder 21 disposed angularly relative to the longitudinal marginal edge 22 of the shim 18, for purposes hereinafter described, and as particularly shown by the dotted lines in FIG. 1.

In the present embodiment the cross sealing bars 5, 6 and bars 12 and 13 are arranged for opposed coacting movement towards sealing and shearing relationship, which action may be provided by means of reversably operating pneumatic cylinders 25 which include reciprocable pistons (not shown), supplied from a fluid pressure source (not shown) by means of respective conduits 26 and 27 in accordance with a timing arrangement such as that disclosed in the aforementioned copending application. It is conceivable, however, that either of the cross sealing members 5 and 6 or the movable support member 7, retaining the bars 12 and 13, may be held stationary if so desired.

The cross sealing bars 5 and 6 are retained for operation by the support member 28 and which member is slidably supported at opposite ends by means of stationary transverse support members 29 and 30, each of which is mounted at its extremity to respective tie bars 31 and 32. The tie bars 31 and 32 are positioned for vertical sliding movement on the upright member 23 (see FIG. 2) and are controlled in such movement by periodically actuated rack and pinion means (not shown) to follow the continuous movement of the webs 1 and 2 during sealing operation as described in my copending application referred to above. The pneumatic cylinders 25 are each mounted on the respective tie bars 31 and 32, as shown in FIGS. 1 and 2, and respectively comprise extending piston rods 35 and 36 which rods have their respective outer extremities threaded to engage the supporting members 28 and 7 for reciprocal, coacting movement thereof.

The assembly comprising the sealing bars 5 and 6 will next be described with particular reference to FIG. 1 and the enlarged detailed view of FIGS. 3 and 4. As will be apparent from FIGS. 3 and 4, the cross sealing bars 5 and 6 are preferably independently mounted in cantilever suspension from the support member 28 by means of vertically arranged shoulder bolts 37 for each member 5 and 6 and distributed in spaced apart relationship longitudinally of the member 28. The shoulder bolts 37 are slidably received in openings transversely of the member 28 and are threaded at their respective reduced end portions to engage a tapped opening in the respective members 5 and 6. The transverse openings in the support member 28 are enlarged at one end to provide a chamber 38 arranged to receive respective coil springs 39 which are disposed circumjacent to respective shoulder bolts 37 and which are arranged to normally urge the bars 5 and 6 in a direction away from the support member 28 for purposes hereinafter described.

In the embodiments of FIGS. 1–4, it is preferred that the sealing bars 5 and 6 operate independently of one another to permit concurrent heat sealing at spaced apart portions disposed at sides opposite of the intermediately positioned knife blade 40. For purposes of explanation, FIGS. 6 and 7 will be referred to merely to illustrate the manner of supporting the knife blade 40 in the support member 28. These figures specifically refer to another embodiment of the present invention, but the manner of holding the knife blade may be identical in either embodiment. Accordingly, the section planes have been staggered as shown in FIG. 1, which figures is a top plan view equally applicable to both embodiments.

The knife blade 40 is recessed to provide the ledge 41 defined by the shoulder 42 and the free edge 43. The free edge 43 is preferably tapered angularly relative to the longitudinal axis of the knife blade as shown in FIG. 1 and the blade preferably extends laterally relative to the right end of the cross sealing bars 5 and 6, as viewed in FIG. 1, to provide an end portion 44. The end portion 44 is arranged for sliding depressing engagement with the tongue 45 extending laterally from the movable support member 7 for purposes hereinafter described.

The knife blade 40 is received in a longitudinal slot of member 28 and retained in suspended supporting relation by means of spaced shoulder bolts 47 having threaded reduced end portions 46 engaging tapped openings in the knife blade 40 and are in tight threaded engagement therewith. The bolts 47 are slidably received by through openings in the support member 28, as shown in FIG. 6, and are maintained in biased upward relationship thereto by means of the helical springs 48 engaging the head of the bolts 47 and the member 28 at the opposite end thereof. It will be apparent that the longitudinal knife receiving slot of the member 28 is arranged to loosely receive the knife 40, the knife being preferably held in place only by spring suspension. The lower end of the threaded portion 46 of the bolts 47 preferably extends through the knife blade 40 and may be further locked or secured in threading engagement with the blade 40 by means of the Allen nuts 49, as shown in FIG. 6. The nuts 49 are rotatably and freely received by the open ended chamber 50 to permit the insertion of an Allen wrench for threading the nut to the portion 49.

With reference to FIG. 7, it will be further apparent that the preferable construction includes alternatively spaced re-entrant holes 51 between the shoulder bolts 47 for receiving a compression coiled spring 52 and which are threaded to engage a set screw 53 for purposes of adjusting the tension of the spring 52 resting thereagainst at one end, and contacting the lower surface of the knife blade 40 at the opposite end thereof. Thus, it will be apparent that the knife blade 40 may be preferably spring suspended from opposed directions for purposes hereinafter described.

A knife guide or tongue 45, as shown in FIG. 7, is maintained in place by means of set screws 54 engaging tapped openings at either side of the guide 45 as a preferred means of holding one end to permit the free end thereof to flex and to be adjusted for depressing guiding engagement with the knife blade 40 as the blade is moved in a direction toward the guide.

With particular reference to the embodiment of FIGS. 6 and 7, it will be apparent that this embodiment comprises substantially like parts as those of the first described embodiment, except for the elimination of certain of the various heat sealing members. In particular the cross seal bar 6 of the structure of FIGS. 2–4 disposed beneath the knife blade 40 has been removed to provide a means of forming open-ended bags sealed only at parallel longitudinal margins of the webs 1 and 2 and at one end seal 56. It will be readily apparent that the presently described embodiment may be obtained by simply removing the threaded shoulder bolts 37 and the spring 39 supporting the cross sealing bar 6. Thus, the seal 56 will be provided on engagement of the heated cross sealing bar 5, the webs 1 and 2 and the opposite coacting bar 12, at the upper side of the knife blades 17 and 40, whereas the portion below the blades will remain unsealed, as shown in FIG. 7, except for the parallel longitudinal edges and previously formed transversely sealed bottom, not shown.

The operation of the combination heat sealing and web shearing means of the present invention will next be described with reference to the embodiment of FIGS. 1–4, adapted to be used with packaging equipment for simultaneously forming, filling and sealing completely the peripheral margins of a package formed from web members 1 and 2. As shown in FIGS. 1 and 2, a preformed bag having its parallel sides and lower end 56 sealed has been provided by prior operational cycles of the apparatus, and is in the process of being filled with material 3 from the filler tube 4. The cross heat sealing elements comprising the members 5, 6 and 12, 13 are shown in spaced apart relationship, out of sealing contact with the webs 1 and 2. A prescribed amount of material 3 flows from the tube 4 into the package, while the webs 1 and 2 are continuously moved in a downward direction relative to FIG. 2, their longitudinal marginal seals having been provided above the filling level by means, not shown, but which may comprise a belt drive passing through heater blocks in accordance with my aforementioned co-pending application, Serial No. 725,902. After the filling has been completed, the cross sealing heat sealing bars are motivated into coacting sealing relation by any desired means, such as by means of a foot operated treadle, or by an automatic timing cycle described and claimed in the said co-pending application. Thus, the reciprocating piston (not shown) contained within the pneumatic cylinders 25 are caused to actuate the piston rods 35 and 36 in opposed inward directions toward one another. It will be apparent, that it is within the scope of the present invention to eliminate the solenoids actuating the piston rods 36 and merely mount the support member 7 in a stationary fashion with the outer edges of the members 12 and 13 being positioned immediately adjacent to the web 1, if so desired. However, the opposed movement of both coacting sealing members provides a preferred and more positive sealing action, in addition to providing immediate release from the sealed package which has particular advantage in continuous automatic operation.

The members are next moved in a continuous and non-interrupted fashion towards one another to concurrently perform a sealing operation and web shearing operation after traversing the full extent of their lateral movement, as shown in FIG. 4. For purposes of illustration, however, the view of FIG. 3 has been added to indicate an intermediate position of the cross bar sealing members, whereby the lower marginal portion 56 of a package provided by the web members 1 and 2 is sealed to permit immediate filling of the material 3, at the same time that the open top of the previously filled package, shown therebelow, is sealed. The knife blade 40 is normally retracted to the position, as shown in FIGS. 1, 2 and 3 with its free edge 43 disposed rearwardly of the outer marginal surface of the heat sealing members 5 and 6, and extends outwardly relative thereto only upon compression of the springs 39 and axially slidable movement of the supporting shoulder bolts 37 to the position shown in FIG. 4. The heat sealing members 5 and 6 are therein shown with their rearward margin in abutting relationship with the support member 28 to permit the retracted knife blade to emerge laterally beyond and in shearing engagement with the blade 17. The blade 40, as shown in FIG. 4, is slidably seated in the slot provided by the recessed surface 20 of the shim 18. If desired, the heat seal may be continued to be applied during the shearing operation for completion thereof being held in sealing relation for the necessary length of time required for sealing the particular film being used to form the package comprising webs 1 and 2. This is accomplished by permitting the tie bars 31 and 32 to be moved vertically of the support 23 to the stop position at 24 by rack and pinion means, not shown, but described in the aforementioned co-pending application. Although the members have been sheared, it will be apparent that the lowermost package will be temporarily held in place because of its impingement between the member 6 and the bar 13. Release of the sealing bars 6 and 13, after the heat sealing has been completed, will permit the finished package to drop below into a conveyor line or tote receptacle or other packaging means as desired. On release of the cross sealing bars from sealing engagement, the bars will be permitted to return upwardly to the position shown in FIGS. 1 and 2 and the next formed package in the continuous web will be in the process of being filled as it moves in a longitudinal downward direction.

The knife blade 40 is provided with a shearing edge 43 angularly of the longitudinal axis in order to first engage an edge of the sealed webs 1 and 2, rather than to attempt to shear the entire web at one time, in order to provide ease in cutting, even in cases wherein the most difficult materials are used.

It is also preferred practice to provide the knife guide 45 as a means of insuring that the cutting edge 43 of the knife blade 40 may be guided below the knife 17 into the groove provided by the recessed surface 20 of the shim 18 and thus insure positive shearing action especially in connection with continuous operation of an apparatus utilizing the same. The knife blade 40 is also secured to the member 28 by spring suspension to permit a floating action and a general resilience to the operation having particular application to the flexibility of the various coacting moving elements comprising the web members 1 and 2 and the cross sealing bars.

The operation of the embodiment of FIGS. 6 and 7 will be apparent, when it is recalled that the main difference between the two embodiments is the elimination of the lower heat sealing bar 6 and its cooperating parts, for the provision of an open-ended bag construction. It is to be noted that the webs 1 and 2 are shown in flattened, face-to-face relationship in FIG. 7 indicating that there is no filling operation to take place. The package member positioned directly below the blades 40 and 17 has been previously sealed at its opposed longitudinal margins and at the bottom margin 56.

It will be apparent that in cases where manual operation is permissible, and where the finished package does not have to be temporarily supported while being sealed, the knife blade 40 will not have to be in retractable relation to the heat sealing members 5 and 6. The shearing may take place, in such instances, at the moment that the sealing operation is initiated, rather than shortly after sealing has begun.

It will be apparent that the present invention has provided an improved apparatus for forming and sealing packages and bags, whereby the sealing operation may be facilely and economically combined with a simultaneous shearing operation to provide a convenient arrangement adaptable for continuous package forming, filling and sealing or which may be adapted for intermittent and manual sealing and trimming operations at stations remote from the initial forming apparatus.

I claim:

1. In an apparatus for transversely sealing and shearing a tube of heat sealable sheet material to form packages therefrom, the combination comprising: a pair of facing support members disposed on opposite sides of said tube and arranged for opposed reciprocal movement toward and away from said tube; a first sealing member mounted on one of said support members and having a sealing face adjacent and transverse to said tube; a second sealing member retractably mounted on the other support member and having a sealing face adjacent and transverse to said tube, said second sealing member being adapted to move between extended and retracted positions with respect to said other support member and being biased toward said extended position; means to heat at least one of said sealing members; a first knife blade mounted on said one of said support members and having a shearing edge substantially coextensive with the sealing face of said first sealing member; a second knife blade mounted on said other support member and having a shearing edge extending forwardly toward said tube, said shearing edge of said second knife blade extending forwardly further than the sealing face of said second sealing member only when said second sealing member has been moved from said extended position toward said retracted position, whereby opposed movement of said support members toward said tube initially causes the sealing faces of said sealing members to clampingly engage a transverse section of said tube therebetween and continuation of such motion causes said clamping engagement to be maintained while said second sealing member is moved from said extended position toward said retracted position, said shearing edge of said second knife then extending forwardly of the sealing face of said second sealing member to shearingly engage said first knife blade to transversely shear said tube; and bias means to cause said first knife blade and said second knife blade to be maintained in tight shearing engagement.

2. An apparatus according to claim 1 wherein each of said sealing members comprises a pair of sealing bars disposed on opposite sides of respective knife blades.

3. An apparatus according to claim 8 wherein the shearing edge of said second knife blade is angularly disposed relative to the longitudinal axis of said second knife blade and is provided with an extending portion that extends forwardly of said second sealing member at a point transversely removed from said tube when said second sealing member is in said extended position, said one of said support members being provided with a forwardly extending guide member adapted to guidingly engage said extending portion of said shearing edge of said second knife blade prior to shearing engagement of said second knife blade with said first knife blade whereby effective shearing engagement of said knife blades is assured.

References Cited in the file of this patent

UNITED STATES PATENTS

| | | |
|---|---|---|
| 2,237,119 | Smith | Apr. 1, 1941 |
| 2,618,814 | Paton | Nov. 25, 1952 |
| 2,641,304 | Biddinger | June 9, 1953 |
| 2,837,883 | Bracey | June 10, 1958 |
| 2,852,898 | Berg | Sept. 23, 1958 |